(No Model.)
J. C. HALTOM.
PLOW.
No. 362,002. Patented Apr. 26, 1887.
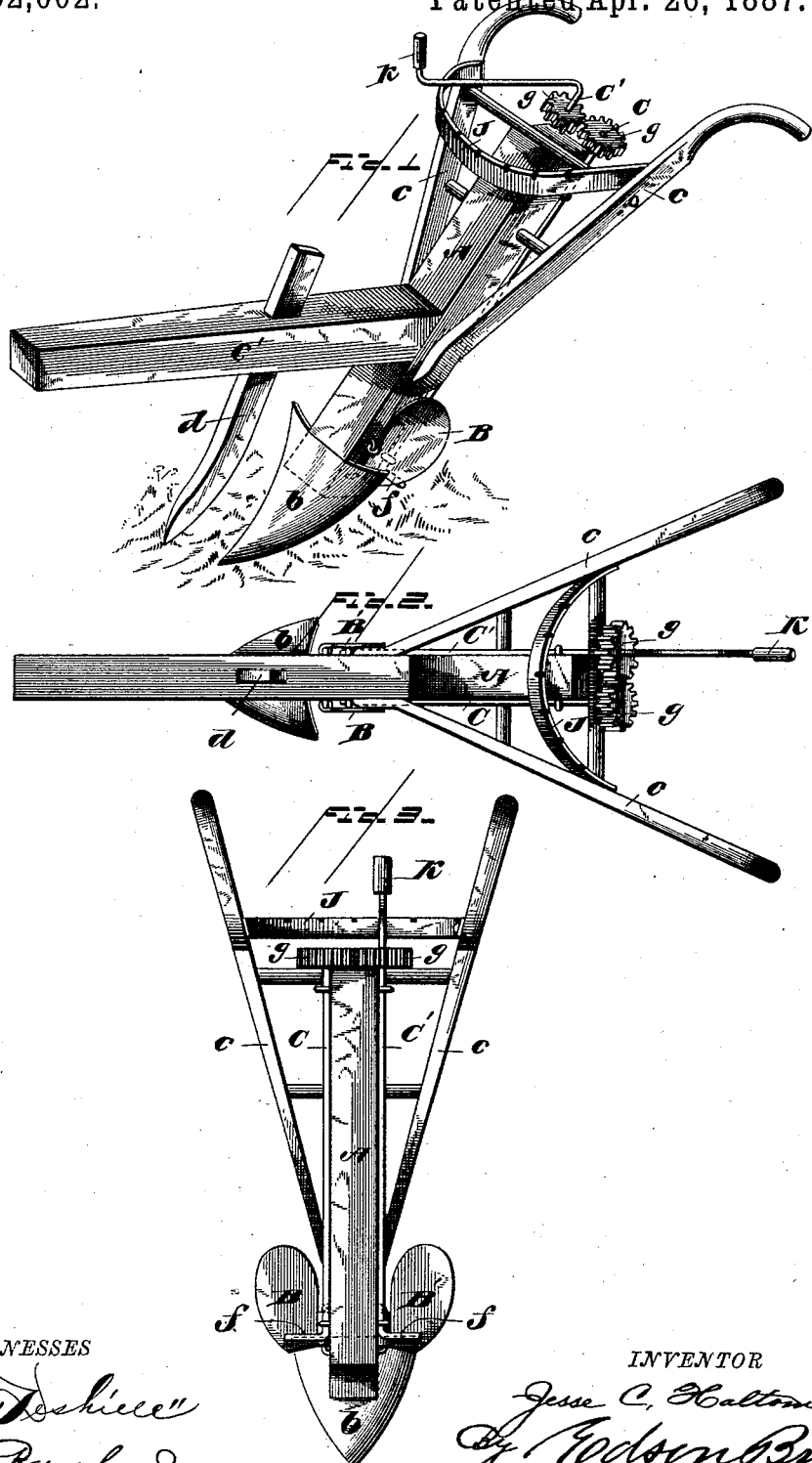
WITNESSES
INVENTOR
Jesse C. Haltom
By Edson Bro's,
Attorney

UNITED STATES PATENT OFFICE.

JESSE C. HALTOM, OF DEANBURG, TENNESSEE, ASSIGNOR OF ONE-HALF TO LEVI A. HARRIS, OF SAME PLACE.

PLOW.

SPECIFICATION forming part of Letters Patent No. 362,002, dated April 26, 1887.

Application filed January 22, 1887. Serial No. 225,157. (No model.)

*To all whom it may concern:*

Be it known that I, JESSE C. HALTOM, a citizen of the United States, residing at Deanburg, in the county of Chester and State of Tennessee, have invented certain new and useful Improvements in Plows, of which the following is a specification, reference being had therein to the accompanying drawings.

My invention has relation to improvements in shovel-plows; and the novelty consists in the peculiar combination and novel construction, arrangement, and adaptation of the various parts for service, as will be hereinafter fully described, and particularly pointed out in the claims.

The object of my invention is to provide a device of the class above named, in which the wings may be swung in opposite directions by the plowman, standing at the usual position at the handles, to increase or diminish the size of the furrow at will; and a further object of my invention is to provide means whereby either one of the wings may be adjusted independently of the other, so that the implement can be used upon a hillside.

I have shown an embodiment of my invention in the accompanying drawings, in which—

Figure 1 is a perspective view; Fig. 2 is a top plan, and Fig. 3 is a rear elevation, thereof.

Referring by letter to the annexed drawings, A designates the stock or upright provided at its lower end with the shovel $b$, the handles $c$, the beam $c'$, and the opener $d$, carried by the beam in front of the stock, all of the parts being constructed as is common in plows of this class.

B B' designate the wings, which are hinged at their inner edges to the stock A, and on each side thereof, just in rear and above the shovel $b$. It will be seen that these wings are free to swing in opposite directions, so that when they are swung up to their highest point they form a continuation of the shovel.

C C' designate the rock-shafts, supported or journaled in suitable bearings on the stock and arranged in rear of the wings B B', said rock-shafts being provided at their lower ends with short right-angled or crank arms $f$. The upper ends of the rock-shafts are provided with gear wheels or pinions $g$, which mesh with each other and are adapted to turn the rock-shafts in opposite directions by means of a crank, $k$, which is rigidly secured to one of the said shafts, preferably the shaft C'. This crank is adapted to travel on a notched segment, J, each end of which is secured to one of the opposing faces of the handles by bolts, or in any suitable manner.

It will be understood by reference to the annexed drawings that the wings normally lie flat against the sides of the stock and rest upon the arms $f$ of the rock-shafts C C', so that when the plow is in operation the furrow is made the width of the shovel only; but when a greater width is desired it is only necessary to turn the crank, which operates the rock-shafts and causes the arms $f$ to impinge against the inner or rear faces of the wings, thereby causing the same to be swung to any desired point. It will also be seen that the wings can be held at any adjustment by the crank engaging with any one of the notches on the segment J.

The pinion $g$ is detachably secured to the upper end of the rock-shaft C, so that it can be removed to permit the shaft C' to be turned by the crank and thereby adjust the wing B, without affecting the shaft C and wing B', whereby the implement is adapted for service upon a hillside.

The operation of my invention will be readily understood from the foregoing description, when taken in connection with the accompanying drawings.

Slight changes can be made in the details of construction without departing from the spirit of my invention.

Having thus fully described my invention, what I claim as new and useful is—

1. The combination of a stock carrying a shovel, the wings hinged to the stock and arranged above the shovel, the rock-shafts journaled on opposite sides of the stock and each having a crank-arm arranged to impinge against the wings, and means whereby the turning of one shaft operates the other and the wings in opposite direction, as and for the purpose set forth.

2. The combination of a stock having a shovel, the wings hinged to the stock, arranged above and in rear of the shovel, the rock-shafts journaled on the stock and geared together for simultaneous rotation and each having a crank-arm at its lower end to impinge against the wings, a crank connected to one of the shafts, and a notched segment secured to the handles of the implement, as and for the purpose set forth.

3. The combination of a stock having a shovel, the hinged wings, the rock-shafts journaled on the stock and having means for operating the wings, one of said shafts having a pinion permanently connected thereto and the other shaft having its pinion detachably held in place, and a crank connected to one of the shafts for operating the same, as and for the purpose set forth.

In testimony whereof I affix my signature in presence of two witnesses.

JESSE C. HALTOM.

Witnesses:
D. K. CASON,
J. F. WEIR.